June 13, 1967 D. W. BOTSTIBER ET AL 3,325,009
MAGNETIC FILTER WITH SIGNALLING MEANS
Filed April 9, 1964 2 Sheets-Sheet 2

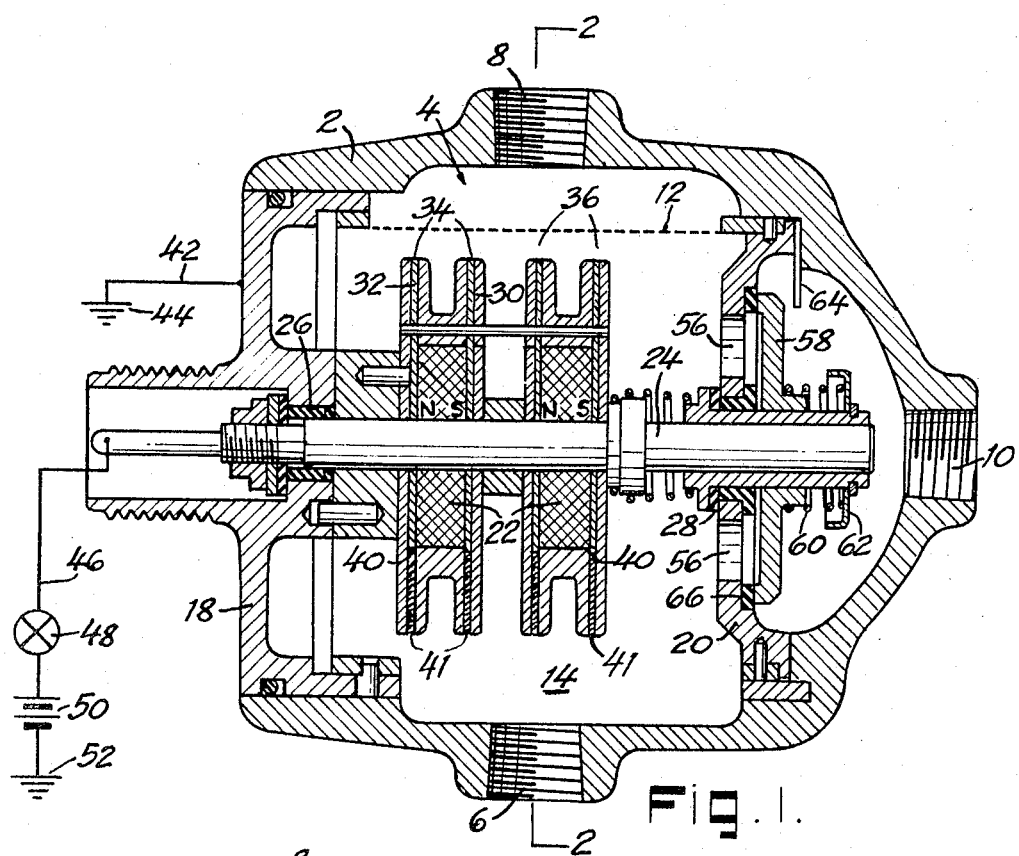

INVENTORS
DIETRICH W. BOTSTIBER
BY NORMAN S. GABLE
Albert Sperry
ATTORNEY

United States Patent Office 3,325,009
Patented June 13, 1967

3,325,009
MAGNETIC FILTER WITH SIGNALLING MEANS
Dietrich W. Botstiber, 307 S. Chester Pike, Glenolden, Pa. 19036, and Norman S. Gable, Havertown, Pa.; said Gable assignor to said Botstiber
Filed Apr. 9, 1964, Ser. No. 358,464
4 Claims. (Cl. 210—86)

This invention relates to filtering means for liquid systems such as lubricating, hydraulic, and other systems and is directed particularly to constructions by which all of the liquid will be filtered and subjected to the action of elements which will produce a signal when particles of foreign matter are accumulated. The device is also constructed so as to retain ferrous particles that are so fine that they would not be retained and removed by a filtering screen and also to produce a signal if particles of electrically conductive yet not necessary ferrous materials are retained.

The filtering device disclosed in copending application Ser. No. 122,156, now Patent No. 3,186,549, issued on June 1, 1965, embodies a screen and magnetic elements for assuring the filtering of all liquid passing through the system and the removal of ferro-magnetic particles from the liquid. The device further is designed to actuate a signal whenever a predetermined amount of conducting material accumulates on the filtering screen or the screen becomes clogged with an excessive amount of any material.

While such devices have proven very successful in use, the actuation of the signal means is effected upon accumulation of ferro-magnetic material on the exterior of the screen and at points spaced from the magnetic elements whereby a relatively large accumulation of such material must develop before the warning signal will be actuated. Furthermore, the magnetic elements are not shielded with the result that the area subjected to magnetic flux is rather extended and the intensity of the field is thereby reduced. Moreover, those ferro-magnetic particles which pass through the screen accumulate on other areas of the magnetic element and do not serve to increase the signal actuating accumulations of material on the liquid filtering screen.

In accordance with the present invention, these objections and limitations of liquid filtering systems of the prior art are overcome and a filtering device provided wherein the liquid is effectively filtered and the accumulations of ferro-magnetic particles removed from the liquid are so localized as to assure sensitive operation of a signalling device. Moreover, the intensity of the magnetic field provided is increased without resorting to the use of larger or more intensively magnetized elements whereby the removal of ferro-magnetic particles from the liquid is rendered more complete.

These advantages are preferably attained by introducing the liquid to be filtered into the interior of a screen which extends about shielded magnetic elements exposed at points adjacent the screen so as to produce an intensified and localized magnetic field arranged to assure effective removal of ferro-magnetic particles from the liquid and more sensitive operation of any signalling means employed.

Accordingly, the principal objects of the present invention are to assure the effective removal of foreign matter and ferro-magnetic particles from liquid circulated through a liquid system, to increase the effectiveness of magnetic elements employed for removing ferro-magnetic particles from a liquid and to render such equipment more sensitive for the operation of a signalling means.

These and other objects and features of the present invention will appear from the following description thereof wherein reference is made to the figures of the accompanying drawings.

In the drawings:

FIG. 1 is a longitudinal sectional view through a typical filter device embodying the present invention;

FIG. 2 is a transverse sectional view of the construction shown in FIG. 1 taken on the line 2—2 thereof;

FIG. 3 illustrates a detail of the construction shown in FIGS. 1 and 2;

Figure 4:
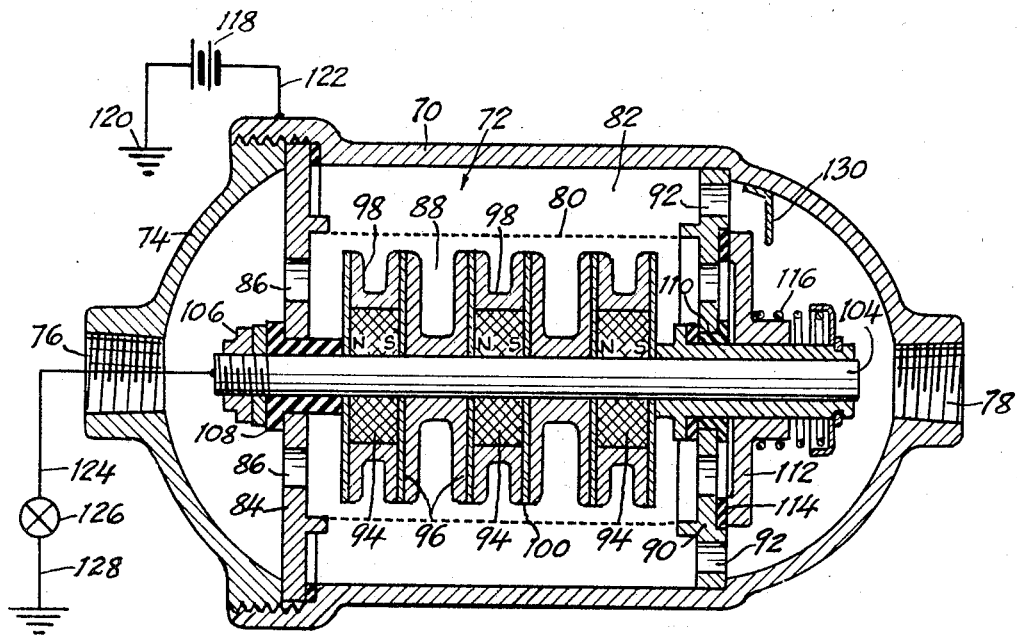
FIG. 4 is a longitudinal sectional view through an alternative construction embodying the present invention.

In that form of the invention illustrated in FIGS. 1, 2 and 3, the filter device embodies a housing 2 having a chamber 4 therein. A liquid inlet 6 serves to supply the liquid to be filtered to the chamber 4 whereas a liquid outlet 8 serves to return filtered liquid to the liquid system or to any other point for use. A safety outlet 10 also communicates with the chamber 4 for discharge of liquid from the chamber when the filter becomes clogged or the device is otherwise subjected to excessive pressure as for example in the event dangerous surging or back pressure should develop in the liquid system.

A filter screen 12 of any desired type and fineness is located within the chamber 4 and as shown in FIG. 2 is in the form of a generally cylindrical element which is open at one side to provide an opening 14 through which liquid from the inlet 6 may pass into the interior of the filter screen. The edges of the filter screen at opposite sides of the elongated opening 14 are secured to ribs 16 projecting inwardly from the housing 2 whereas one end of the screen is closed by firm engagement with a closure member 18 forming one end of the housing 2. The opposite end of the filter screen is closed by means of a member 20 which is located within the housing adjacent the safety outlet 10. The housing and members 18 and 20 are formed of electrically conducting but non-magnetic material such as aluminum, brass or the like and in general, may be of any desired shape or size. With this construction, all of the liquid entering the chamber 4 through the liquid inlet 6 will be caused to flow through the filter screen 12 before it can pass to the liquid outlet 8. As a result, all of the liquid will be effectively filtered and all particles of dirt, tar, metal chips or other foreign matter of a size too large to pass through the filter screen will be retained by the screen. Therefore, only filtered oil or other liquid supplied to the filter device will be discharged from the liquid outlet 8 and supplied to the liquid system.

In order to remove ferro-magnetic particles of even smaller size from the liquid being filtered and in order to actuate a signal when the filter screen needs cleaning or has a predetermined accumulation of conducting particles thereon, magnetic elements are located within the filter screen in position to be contacted by the liquid to be filtered. The magnetized elements are preferably made of electrically conducting material and are in the form of annular bodies 22 supported by an electrically conducting rod 24 which passes through nonconducting bushings 26 and 28 carried by the end plates 18 and 20 to which the screen is secured. The opposite faces of the annular magnetized bodies are of opposite magnetic polarity and are engaged by ferro-magnetic elements 30 and 32 which are preferably in the form of flat electrically conducting discs or plates. The peripheral edges 34 of the plates 30 and 32 are located adjacent the inner surface of the screen 12 and the screen itself is preferably formed of ferro-magnetic material. In this way, a magnetic circuit will be established from one pole of the magnetized body 22 through the ferro-magnetic plate 30 and a small gap 36 to the filter screen 12 and back through another small gap 36 from the screen 12 to ferro-magnetic plate 32 and the opposite pole of the magnetized body 22. Two assemblies providing such magnetic circuits are illustrated in the construction shown in FIG. 1, but it will be apparent that any desired number of such assemblies may be mounted on the rod 24 and located within the chamber 4.

The construction thus provided renders it possible to position the edges of the plates 30 and 32 as close as desired to the screen 12 so that the width of the gaps 36 in the magnetic circuit may be relatively small and the magnetic flux in such gaps correspondingly high. However, in order further to increase the intensity of the magnetic circuit and the flux in the gaps 36, the plates 30 and 32 are preferably shielded throughout their opposite faces and that portion of the edges thereof facing the liquid inlet 6 and the opening 18 in the screen 12. For this purpose, the ferro-magnetic plates 30 and 32 may be cut away as shown at 40 in FIG. 3 and covered throughout their opposite faces and portion 40 with non-magnetic material 41 such as copper, aluminum, ceramic material or the like. When thus shielded, the magnetic flux is essentially confined within ferro-magnetic material and the gaps 36. Such shielding of the plates 30 and 32 further serves to prevent accumulation of metal chips and fine ferro-magnetic particles throughout the surface of the plates or other portions of the magnetized assembly except the peripheral edges of the plates 30 and 32 and the portions of the screen 12 adjacent the gaps 36. As a result, the "build-up" or accumulation of metallic particles is highly localized and concentrated so that even those particles of ferro-magnetic material which are so fine that they might otherwise pass through the screen 12 are drawn into the gaps 36 and aid in establishing an electrically conducting bridge between the screen and the plates 30 or 32.

The development of an electrically conducting bridge across any gap 36 serves, in accordance with the present invention, to complete a signalling circuit for the purpose of indicating the existence of an unfavorable condition in the filtering device. Any suitable or preferred signalling means and circuitry can be employed for this purpose. As shown in FIG. 1, the signalling circuit includes a conductor 42 connected to the end member 18 or to any other suitable part of the housing 2 and to the ground at 44. The electrically conducting rod 24 by which the magnetized assembly, including plates 30 and 32, is in turn connected by a conductor 46 to a signal device 48 and current source 50 to ground at 52. Therefore, whenever a large electrically conducting particle or an accumulation of small electrically conducting particles establish a current conducting bridge across any of the gaps 36, the signalling circuit will be completed to actuate the signal device 48 and give an indication of the adverse condition which has developed.

As a further safeguard in the operation of the filter device, pressure responsive means are provided to permit liquid to flow from the interior of the filter screen 12 to the safety outlet 10 when the screen becomes clogged with dirt, tar or other foreign matter or whenever excessive pressure builds up within the chamber 4 for any other reason. For this purpose, the member 20 is provided with ports or openings 56 which are normally closed by means of a valve member 58 located in the space between member 20 and the end of the housing 2 with which the safety outlet 10 communicated. The valve member 58 is slidably movable on the rod 24 and is urged toward the member 20 by means of a spring 60 which bears at one end against the valve member and at its opposite end against a washer or element 62 on the rod 24. The spring 60 thus normally causes the valve member to seal the opening 56 but is yieldable whenever any excessive pressure develops within the filter screen 12 to permit liquid to flow through the openings 56 to the safety outlet 10.

In order to provide a signal or indication when the filter is clogged or is discharging liquid to the safety outlet 10 for any other reason, the device is preferably also provided with means for completing an electrical circuit through the signal device 48 or some other signalling means when the valve member 58 is displaced from its normal sealing position. In the construction shown in FIG. 1, this is accomplished by providing the housing 2 with a contact element 64 engageable by the valve member 58 upon axial movement thereof to permit the flow of liquid through the ports 56. For this purpose, the valve member 58 is formed of conducting material and is conductively connected to rod 24. On the other hand, the valve member is electrically insulated from the member 20 by means of the sealing gasket 66 and the member 20 itself is insulated from the rod 24 by an insulating bushing 28. Accordingly, the circuit including the signalling device 48 will not be completed to the housing and ground 44 through the valve member as long as the valve member is held in its normal port sealing position. However, when sufficient pressure develops within the filter screen 12 to overcome the action of spring 60, the valve member will move axially to a valve opening position wherein it will engage the contact element 64 on the housing to complete the signalling circuit.

The filter device thus provided not only serves to assure the effective filtering of all the liquid passed through the device but also affords improved sensitivity in operation of the signalling means by reason of the concentrated and relatively high magnetic flux in the gaps between the periphery of the plates 30 and 32 and the filter screen 12. The construction further is capable of collecting and accumulating particles of ferro-magnetic material of such fineness that they would otherwise pass through the filter screen and such particles are added to those larger particles mechanically retained by the screen and attracted by the magnetic field in gap 36 to build up an electrically conducting contact across the gap for actuating the signal means employed.

Figure 5:
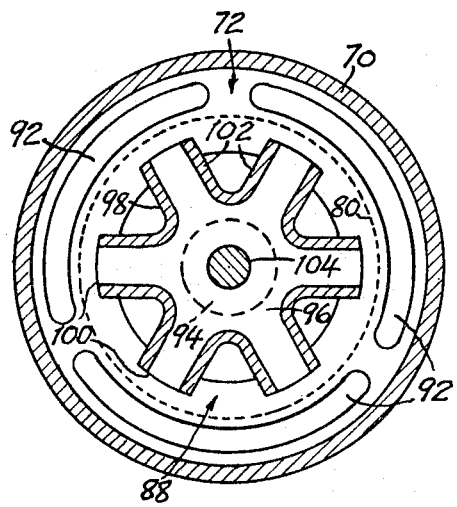
FIG. 5 is a transverse sectional view of the construction shown in FIG. 4 taken on the line 5—5 thereof.

While filter devices such as that shown in FIGS. 1, 2 and 3 have certain advantages, the present invention may be embodied in other forms of equipment such as that illustrated in FIGS. 4 and 5, for example. Thus, FIGS. 4 and 5 illustrate an alternative form of the present invention wherein the direction of fluid flow through the filter is axial, rather than transverse. In this form of the invention, the filter unit is provided with a housing 70 having a chamber 72 therein which is closed at one end by a cover member 74. The cover member 74 has an inlet port 76 through which liquid to be filtered passes into the chamber 72 and has an outlet port 78 through which liquid from chamber 72 is discharged. A completely cylindrical screen 80 is mounted within the chamber 72 and has a diameter somewhat smaller than the diameter of chamber 72 so that an annular passage 82 is formed between the screen 80 and the housing 70. The upper end of screen 80 is held in place by a top plate 84 formed on the cover member 74 and provided with a plurality of apertures 86 communicating with inlet port 76 and the space 88 within screen 80. The lower end of screen 80 is secured by a bottom plate 90 formed on the housing 70 and provided with a plurality of apertures 92 communicating with passage 82 and outlet port 78.

The magnetic filtering elements comprise a plurality of annular elements 94 which are axially magnetized and are provided with pole pieces 96 formed as shown in FIG. 5. Shielding means 98 formed of electrically conductive, non-magnetic material are provided and serve to enclose the magnets 94 and all of the surfaces of pole pieces 96 except for the extremities 100 of the arms 102 of the pole pieces. The exposed extremities 100 of the pole pieces are located adjacent but spaced a small distance from the ferro-magnetic screen 80 so as to cooperate with the screen to provide a strong and localized magnetic field therebetween to attract and hold ferro-magnetic particles in the space therebetween the screen and extremities 100 of the pole pieces.

With this construction, the liquid to be filtered enters inlet port 76 and passes through openings 86 in top plate 82 to the space 88 within screen 80. Ferro-magnetic particles are then attracted to and entrapped between the extremities 100 of pole pieces 96 and the screen 80 while other foreign matter is mechanically filtered from the liquid as it flows outward through screen 80. The filtered liquid then flows through passage 72 on the exterior of the screen 80 and within the housing 70 to apertures 92 in bottom plate 90 to be discharged through outlet port 78.

The magnets 94, pole pieces 96 and shielding means 98 are secured in place by a metal rod 104. One end of rod 104 extends through top plate 84 and is secured in place by suitable means, such as nut 106, but is electrically insulated from the top plate 84 by bushing 108. The lower end of rod 104 projects through a central opening 110 in bottom plate 90. A metal valve member 112 is slidably mounted on the lower end of rod 104 but is electrically insulated from plate 90 by a sealing element 114. A spring 116 normally urges valve member 112 toward the plate 90 to seal the opening 110 therein. However, in the event filter screen 80 becomes clogged with foreign matter to such an extent as to unduly restrict the flow of liquid through the filter, the fluid pressure will cause valve member 112 to open against the action of spring 116 permitting unfiltered fluid to be discharged through the outlet port 78 preventing rupture of the filter screen 80 or injury to the filter device.

In order to provide a warning signal when the accumulation of foreign matter becomes excessive, one side of a source of electrical current 118 is connected to ground at 120 while the other side is connected by conductor 122 to the cover member 74 (or housing 70). Rod 104 is connected by conductor 124 to an indicating device 126 of the type which emits a signal upon completion of an electrical circuit therethrough. The other side of indicating device 126 is connected to ground by conductor 128. Therefore, when sufficient ferro-magnetic material accumulates in the space between screen 80 and extremities 100 of pole piece 96 to bridge the space therebetween, the signal device 126 will be actuated. Further in order to provide a warning signal when the filter screen is so clogged with foreign matter as to cause the valve member 112 to open, a contact 130 is connected to the housing 70 and positioned to be engaged by the valve member to complete a circuit between the rod 104 and the housing for actuating indicating means 126.

While the pole pieces 96 of the device shown in FIGS. 4 and 5 are formed with radially extending arms 102, the pole pieces may instead be in the form of circular discs with openings therethrough for the passage of liquid longitudinally within the space 88, if desired. However, it will then be desirable to magnetically shield the edges of the pole pieces adjacent such openings in order to assure the presence of the maximum and localized flux between the periphery of the pole pieces and the filter screen.

In each of the forms of the invention shown, the intensity of the magnetic flux in localized areas for attracting ferro-magnetic material and developing an electrically conducting path for actuating signal means, is increased while employing relatively small magnetized elements by reason of the action of the shielding means in confining the magnetic lines of force to the pole pieces and flux gap. Furthermore, the width of the gap can be limited as desired to assure sensitive operation of the signalling circuit by employing pole pieces of a diameter but little less than the inner diameter of the filter screen itself.

It will, thus, be apparent that numerous changes and modifications may be made in the form, construction and arrangement of the elements in filter devices embodying the present invention. In view thereof, it should be understood that the particular embodiments of the invention shown in the drawings and described above are intended to be illustrative only and are not intended to limit the scope of the invention.

We claim:

1. A device for filtering ferro-magnetic and other foreign matter from a liquid comprising a housing having an inlet and an outlet, a generally cylindrical filter screen located within said housing between said inlet and outlet and in a position to cause liquid flowing from said inlet to said outlet to pass therethrough, a rod supported within said housing and extending substantially axially of said filter screen, magnetic elements supported on said rod, ferro-magnetic electrically conducting pole pieces in the form of discs contacting opposite poles of said magnetic elements and having peripheral edges thereof located adjacent but spaced a short distance from the inner surface of said filter screen, said filter screen being formed of electrically conducting ferro-magnetic material and cooperating with the edges of the pole pieces to establish a magnetic field in localized areas of the filter screen for attracting ferro-magnetic material to the filter screen adjacent the edges of the pole pieces, said magnetic elements and the lateral faces of said pole pieces being enclosed within non-magnetic shielding material while leaving only those portions of the peripheral edges of the pole pieces which are adjacent the filter screen exposed to increase the density of the magnetic flux in the space between the pole pieces and said localized areas of the filter screen, and a signalling circuit electrically connected to said pole pieces and filter screen and responsive to the presence of an electrically conducting accumulation of material between a pole piece and said filter screen.

2. A device as defined in claim 1 wherein the inlet in said housing communicates with the interior of said filter screen and the outlet communicates with the exterior of the filter screen.

3. A device as defined in claim 1 wherein a pressure responsive valve communicates with the interior of the filter screen and is operable to relieve excessive pressure developed within the screen.

4. A device for filtering ferro-magnetic and other foreign matter from a liquid comprising a housing having an inlet and an outlet, a filter screen located in said housing between said inlet and outlet and in a position to cause all of the liquid flowing from said inlet to said outlet to pass therethrough, a rod supported within said housing and extending substantially parallel to said filter screen on that side of said screen toward which liquid flows in passing from said inlet through the screen, magnetic elements supported on said rod, ferro-magnetic electrically conducting pole pieces in the form of substantially flat plates extending at right angles to said rod and contacting opposite poles of said magnetic elements, said pole pieces having at least one edge thereof located adjacent but spaced a short distance from that side of the screen toward which the liquid flows in passing from said inlet through the screen, said filter screen being formed of electrically conducting ferro-magnetic material and cooperating with the edges of the pole pieces adjacent thereto to establish a magnetic field in localized areas of the filter screen for attracting ferro-magnetic material to the filter screen adjacent the edges of the pole pieces, said magnetic elements and the lateral faces of said pole pieces being enclosed within non-magnetic shielding material while leaving only those portions of the edges of the pole pieces which are adjacent the filter screen exposed to increase the density of the magnetic flux in the space between the pole pieces and said localized areas of the filter screen, and a signalling circuit electrically connected to said pole pieces and filter screen and responsive to the presence of an electrically conducting accumulation of material between a pole piece and said filter screen.

References Cited

UNITED STATES PATENTS

| | | | |
|---|---|---|---|
| 2,678,729 | 5/1954 | Spodig | 210—222 |
| 2,800,230 | 7/1957 | Thoma | 210—223 |
| 3,186,549 | 6/1965 | Botstiber | 210—86 |

FOREIGN PATENTS 864,450    4/1961    Great Britain.

REUBEN FRIEDMAN, *Primary Examiner.*

F. W. MEDLEY, *Assistant Examiner.*